US008879445B2

United States Patent
Sadek et al.

(10) Patent No.: US 8,879,445 B2
(45) Date of Patent: Nov. 4, 2014

(54) MITIGATING IMPACT OF POWER IMBALANCE ON REMOTE DATA RATE IN WIRELESS LOCAL AREA NETWORK

(75) Inventors: Ahmed K. Sadek, San Diego, CA (US); Ashok Mantravadi, San Diego, CA (US); Tamer Adel Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 80 days.

(21) Appl. No.: 13/547,696

(22) Filed: Jul. 12, 2012

(65) Prior Publication Data
US 2013/0107868 A1   May 2, 2013

Related U.S. Application Data

(60) Provisional application No. 61/551,896, filed on Oct. 26, 2011.

(51) Int. Cl.
| | | |
|---|---|---|
| *H04B 7/00* | (2006.01) | |
| *H04L 1/16* | (2006.01) | |
| *H04W 52/32* | (2009.01) | |
| *H04W 52/24* | (2009.01) | |
| *H04L 1/00* | (2006.01) | |
| *H04L 1/18* | (2006.01) | |

(52) U.S. Cl.
CPC ........... *H04W 52/325* (2013.01); *H04L 1/0001* (2013.01); *H04L 1/1692* (2013.01); *H04L 1/1854* (2013.01); *H04W 52/244* (2013.01)
USPC .......................................................... 370/310

(58) Field of Classification Search
CPC .. H04L 47/26; H04L 47/263; H04W 52/0209
USPC ................... 370/310, 328, 342, 349
See application file for complete search history.

(56) References Cited

U.S. PATENT DOCUMENTS

| | | | | |
|---|---|---|---|---|
| 5,963,559 A | * | 10/1999 | Ohki | 370/445 |
| 6,993,341 B2 | * | 1/2006 | Hunzinger | 455/450 |

(Continued)

FOREIGN PATENT DOCUMENTS

| | | |
|---|---|---|
| EP | 1758265 A1 | 2/2007 |
| EP | 2268088 A1 | 12/2010 |
| WO | 0221704 A2 | 3/2002 |

OTHER PUBLICATIONS

Chen, Y., et al., "WLC24-6: An Analytical Model of Block Acknowledgement and Selective Retransmission in an 802.11e WLAN Network", Global Telecommunications Conference, 2006. Globecom '06. IEEE, IEEE, PI, Nov. 1, 2006, pp. 1-5, XP031075758, ISBN: 978-1-4244-0356-1 the whole document.

(Continued)

*Primary Examiner* — Dmitry H Levitan
(74) *Attorney, Agent, or Firm* — Seyfarth Shaw LLP

(57) ABSTRACT

A method for mitigating the impact of a power imbalance on a remote data rate in a wireless local area network (WLAN) includes transmitting a wireless local area network (WLAN) acknowledgement (ACK) packet at a first transmit power level to a remote device. The method further includes transmitting, to the remote device, a WLAN data packet at a second transmit power level that is lower than the first transmit power level of the WLAN ACK packet. Another method for mitigating the impact of a power imbalance on a remote data rate in a wireless local area network (WLAN) may include selecting a wireless local area network (WLAN) acknowledgement (ACK) packet transmit rate independent from a rate at which a WLAN data packet is received. This method further includes transmitting, to a remote device, a WLAN ACK packet at the selected WLAN ACK packet transmit rate.

20 Claims, 12 Drawing Sheets

(56) References Cited

U.S. PATENT DOCUMENTS

| | | | |
|---|---|---|---|
| 7,567,536 B2 * | 7/2009 | Czaja et al. | 370/332 |
| 7,720,038 B2 | 5/2010 | Bennett | |
| 7,801,099 B2 | 9/2010 | Desai | |
| 8,345,704 B2 * | 1/2013 | Desai et al. | 370/438 |
| 8,442,016 B1 * | 5/2013 | Lee et al. | 370/338 |
| 2004/0252670 A1 * | 12/2004 | Rong et al. | 370/343 |
| 2008/0144493 A1 | 6/2008 | Yeh | |
| 2008/0194283 A1 | 8/2008 | Chaponniere | |
| 2009/0135754 A1 | 5/2009 | Yavuz et al. | |
| 2010/0061326 A1 * | 3/2010 | Lee et al. | 370/329 |
| 2010/0323745 A1 | 12/2010 | Chen et al. | |
| 2010/0330977 A1 * | 12/2010 | Kadous et al. | 455/419 |
| 2011/0002278 A1 * | 1/2011 | Lindoff et al. | 370/329 |
| 2011/0044275 A1 * | 2/2011 | Ishii | 370/329 |
| 2011/0059762 A1 | 3/2011 | Jones, IV et al. | |
| 2011/0069772 A1 * | 3/2011 | Vrzic et al. | 375/261 |
| 2011/0096693 A1 * | 4/2011 | Astely et al. | 370/252 |
| 2012/0034913 A1 * | 2/2012 | Wang et al. | 455/426.1 |
| 2012/0047230 A1 * | 2/2012 | Begen et al. | 709/219 |
| 2013/0322397 A1 * | 12/2013 | Lee et al. | 370/329 |

OTHER PUBLICATIONS

IEEE P802.11af/D5.0, Draft Standard for Information Technology, Telecommunications and information exchange between systems, Local and metropolitan area networks, Specific requirements, Part 11: Wireless LAN Medium Access Control, (MAC) and Physical Layer (PHY) specifications, Amendment 5: TV White Spaces Operation, Jun. 2013, 336 pages.

International Search Report and Written Opinion—PCT/US2012/046882—ISA/EPO—May 6, 2013.

Jung, H., et al., "RARA: Rate Adaptation Using Rate-Adaptive Acknowledgment for IEEE 802.11 WLANs", Consumer Communications and Networking Conference, 2008. CCNC 2008. 5th IEEE, IEEE CCP, Piscataway, NJ, USA, Jan. 1, 2008, pp. 62-66, XP031211829, ISBN: 978-1-4244-1456-7 paragraph [0001]-paragraph [0111].

* cited by examiner

MITIGATING IMPACT OF POWER IMBALANCE ON REMOTE DATA RATE IN WIRELESS LOCAL AREA NETWORK

CROSS-REFERENCE TO RELATED APPLICATION

The present application for patent claims the benefit of U.S. Provisional Application No. 61/551,896 filed on Oct. 26, 2011, in the names of A. K. Sadek et al., the disclosure of which is expressly incorporated by reference herein in its entirety.

TECHNICAL FIELD

The present description is related, generally, to multi-radio techniques and, more specifically, to techniques for mitigating the impact of a power imbalance on a remote data rate in a wireless local area network (WLAN).

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith. It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

According to one aspect of the present disclosure, a method for mitigating the impact of a power imbalance on a remote data rate in a wireless local area network (WLAN) is described. The method includes transmitting a wireless local area network (WLAN) acknowledgement (ACK) packet at a first transmit power level to a remote device. The method further includes transmitting, to the remote device, a WLAN data packet at a second transmit power level that is lower than the first transmit power level of the WLAN ACK packet.

In another aspect, an apparatus for mitigating the impact of a power imbalance on a remote data rate in a wireless local area network (WLAN) is described. The apparatus includes at least one processor; and a memory coupled to the at least one processor. The processor(s) is configured to transmit a wireless local area network (WLAN) acknowledgement (ACK) packet at a first transmit power level to a remote device. The processor(s) is also configured to transmit, to the remote device, a WLAN data packet at a second transmit power level that is lower than the first transmit power level of the WLAN ACK packet.

In a further aspect, a computer program product for mitigating the impact of a power imbalance on a remote data rate in a wireless local area network (WLAN) is described. The computer program product includes a non-transitory computer-readable medium having program code recorded thereon. The computer program product has program code to transmit a wireless local area network (WLAN) acknowledgement (ACK) packet at a first transmit power level to a remote device. The computer program product also includes program code to transmit, to the remote device, a WLAN data packet at a second transmit power level that is lower than the first transmit power level of the WLAN ACK packet.

In another aspect, an apparatus for mitigating the impact of a power imbalance on a remote data rate in a wireless local area network (WLAN) is described. The apparatus includes means for transmitting a wireless local area network (WLAN) acknowledgement (ACK) packet at a first transmit power level to a remote device. The apparatus further includes means for transmitting, to the remote device, a WLAN data packet at a second transmit power level that is lower than the first transmit power level of the WLAN ACK packet.

According to another aspect of the present disclosure, a method for mitigating the impact of a power imbalance on a remote data rate in a wireless local area network (WLAN) is described. The method includes selecting a wireless local area network (WLAN) acknowledgement (ACK) packet transmit rate independent from a rate at which a WLAN data packet is received. The method further includes transmitting, to a remote device, a WLAN ACK packet at the selected WLAN ACK packet transmit rate.

In another aspect, an apparatus for mitigating the impact of a power imbalance on a remote data rate in a wireless local area network (WLAN) is described. The apparatus includes at least one processor; and a memory coupled to the at least one processor. The processor(s) is configured to select a wireless local area network (WLAN) acknowledgement (ACK) packet transmit rate independent from a rate at which a WLAN data packet is received. The processor(s) is also configured to transmit, to a remote device, a WLAN ACK packet at the selected WLAN ACK packet transmit rate.

In a further aspect, a computer program product for mitigating the impact of a power imbalance on a remote data rate in a wireless local area network (WLAN) is described. The computer program product includes a non-transitory computer-readable medium having program code recorded thereon. The computer program product has program code to select a wireless local area network (WLAN) acknowledgement (ACK) packet transmit rate independent from a rate at which a WLAN data packet is received. The computer program product also includes program code to transmit, to a remote device, a WLAN ACK packet at the selected WLAN ACK packet transmit rate.

In another aspect, an apparatus for mitigating the impact of a power imbalance on a remote data rate in a wireless local area network (WLAN) is described. The apparatus includes means for selecting a wireless local area network (WLAN) acknowledgement (ACK) packet transmit rate independent from a rate at which a WLAN data packet is received. The apparatus further includes means for transmitting, to a remote device, a WLAN ACK packet at the selected WLAN ACK packet transmit rate.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
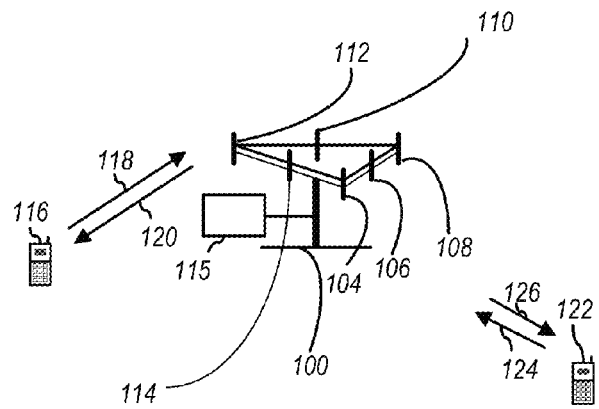
FIG. 1 illustrates a multiple access wireless communication system according to one aspect.

A multi-radio device, such as User Equipment (UE), may experience coexistence issues among various ones of its constituent radio devices that operate at the same time. For example, transmissions from a Long Term Evolution (LTE) modem operating on a UE may interfere with a UE receiver for use with a wireless local area network (WLAN) device, such as an 802.11 radio, or the like. In one aspect of the present disclosure, a wireless local area network (WLAN) acknowledgement (ACK) packet is transmitted at a first power level and a WLAN data packet is transmitted at a second power level that is lower than the WLAN ACK packet transmit power level. In this aspect of the present disclosure, an increased ACK packet transmit power level is used when a wireless station operates at a reduced transmit power level due to coexistence issues between an wireless modem and a WLAN radio device of a multi-radio wireless station. In a further aspect of the present disclosure, a WLAN ACK packet transmit rate is selected that is independent from a rate at which a WLAN data packet is received.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 188, 120, 124 and 126 can use different frequencies for communication. For example, the downlink 120 can use a different frequency than used by the uplink 188.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
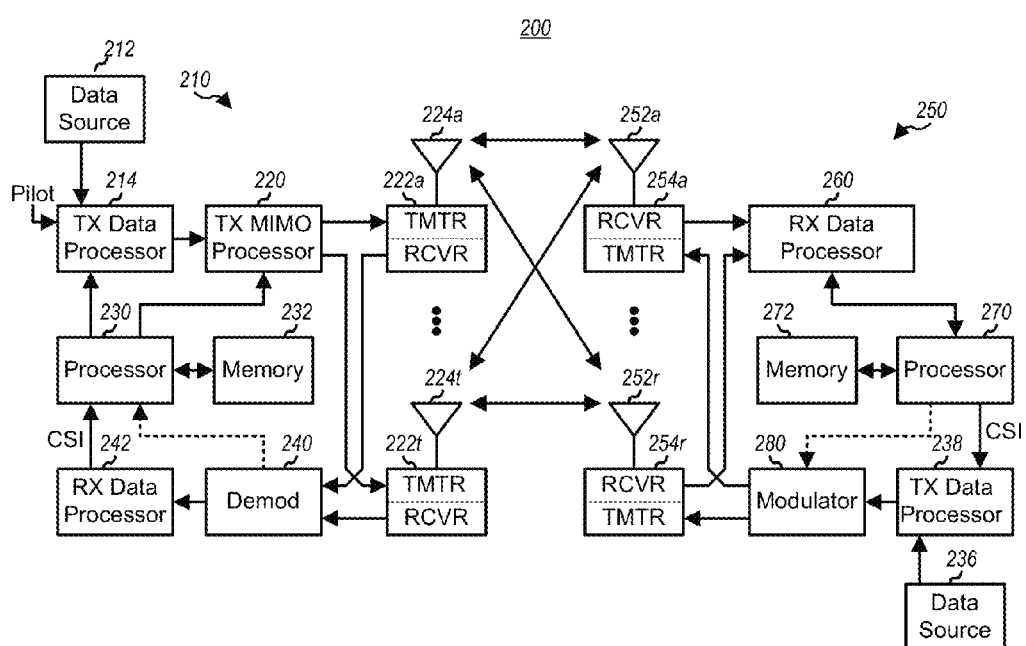
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, wherein NS≤min {NT, NR}. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides NT modulation symbol streams to NT transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from the transmitters 222a through 222t are then transmitted from NT antennas 224a through 224t, respectively.

At a receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NR "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
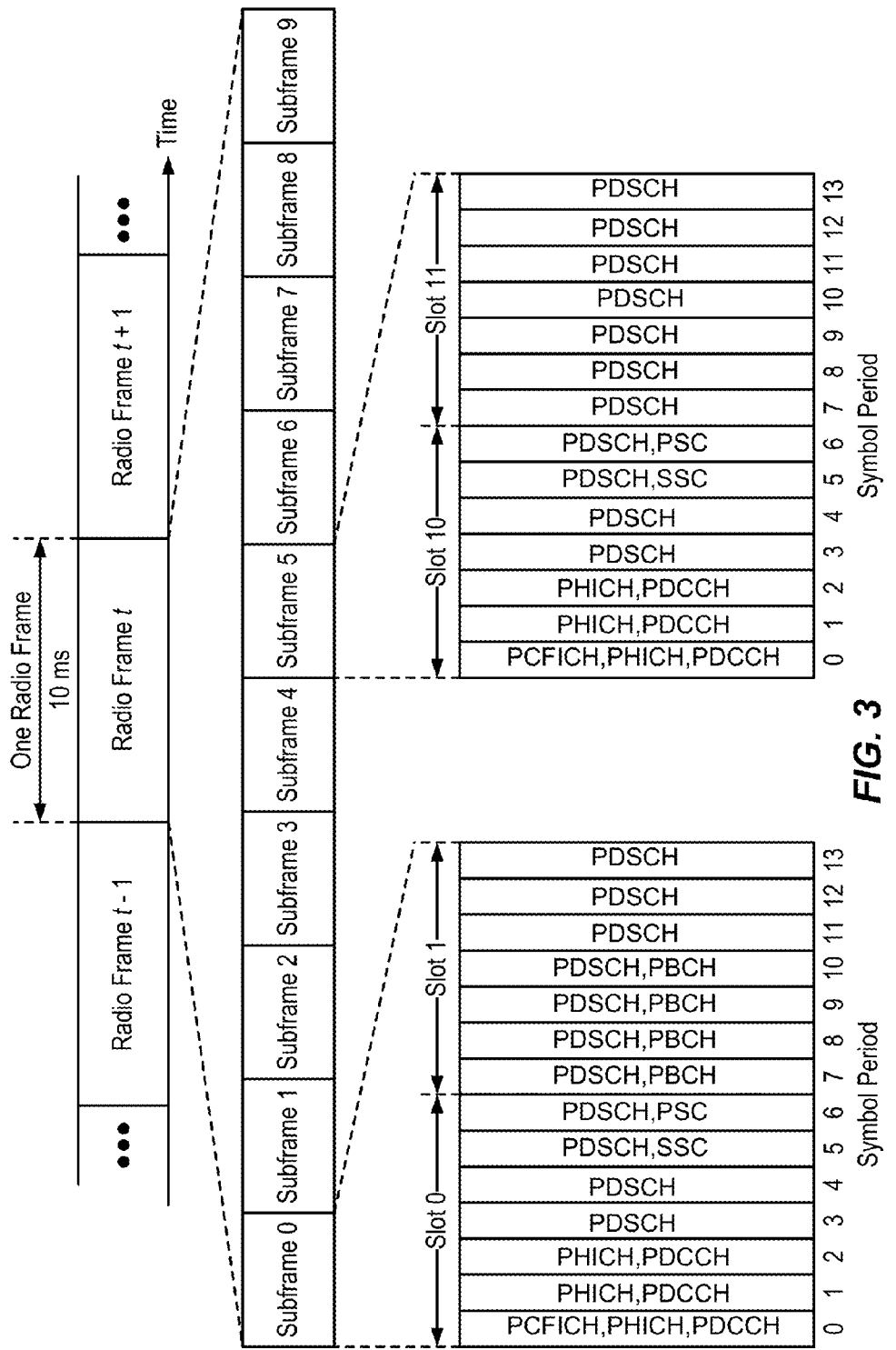
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
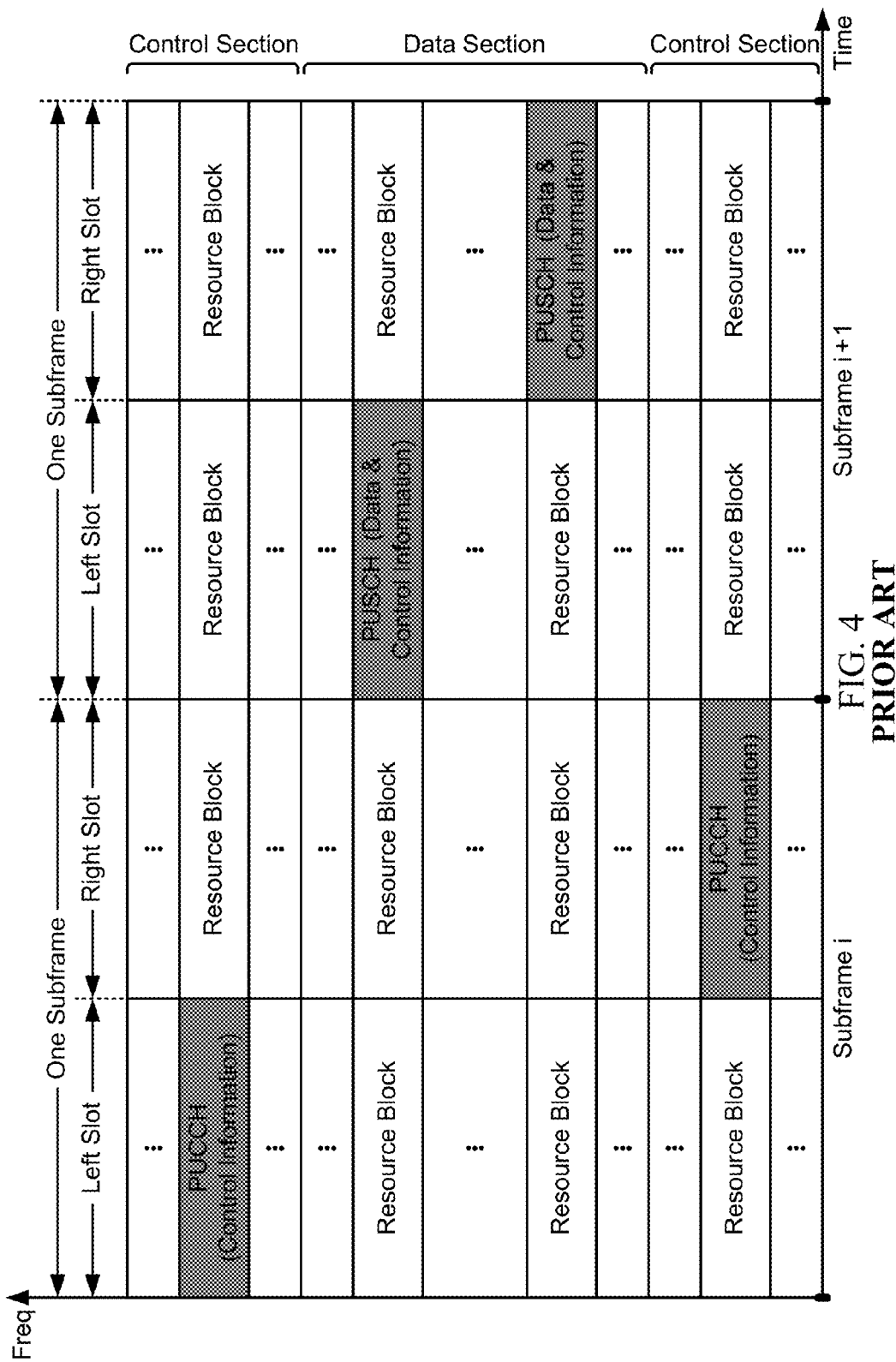
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
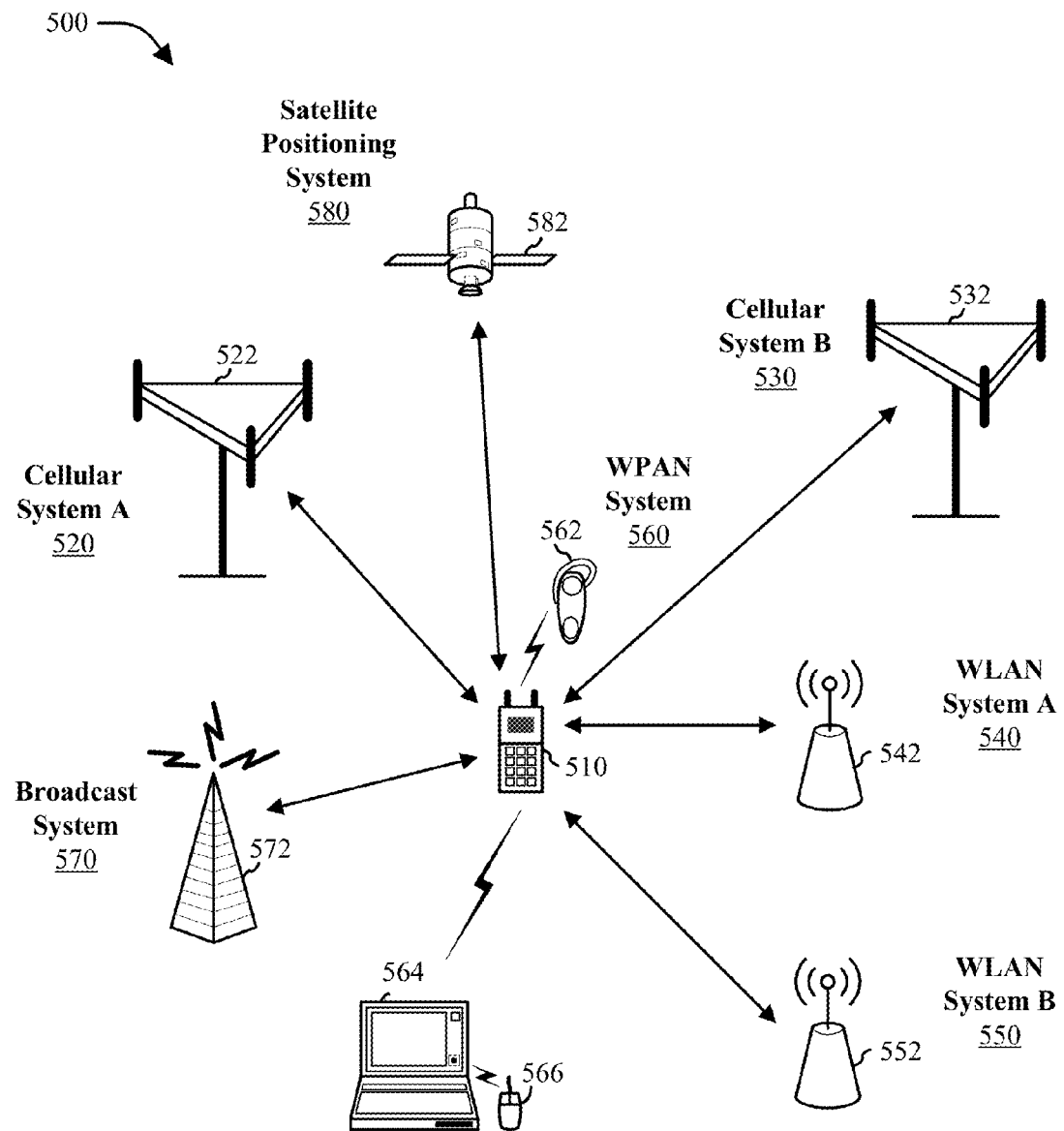
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™ Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
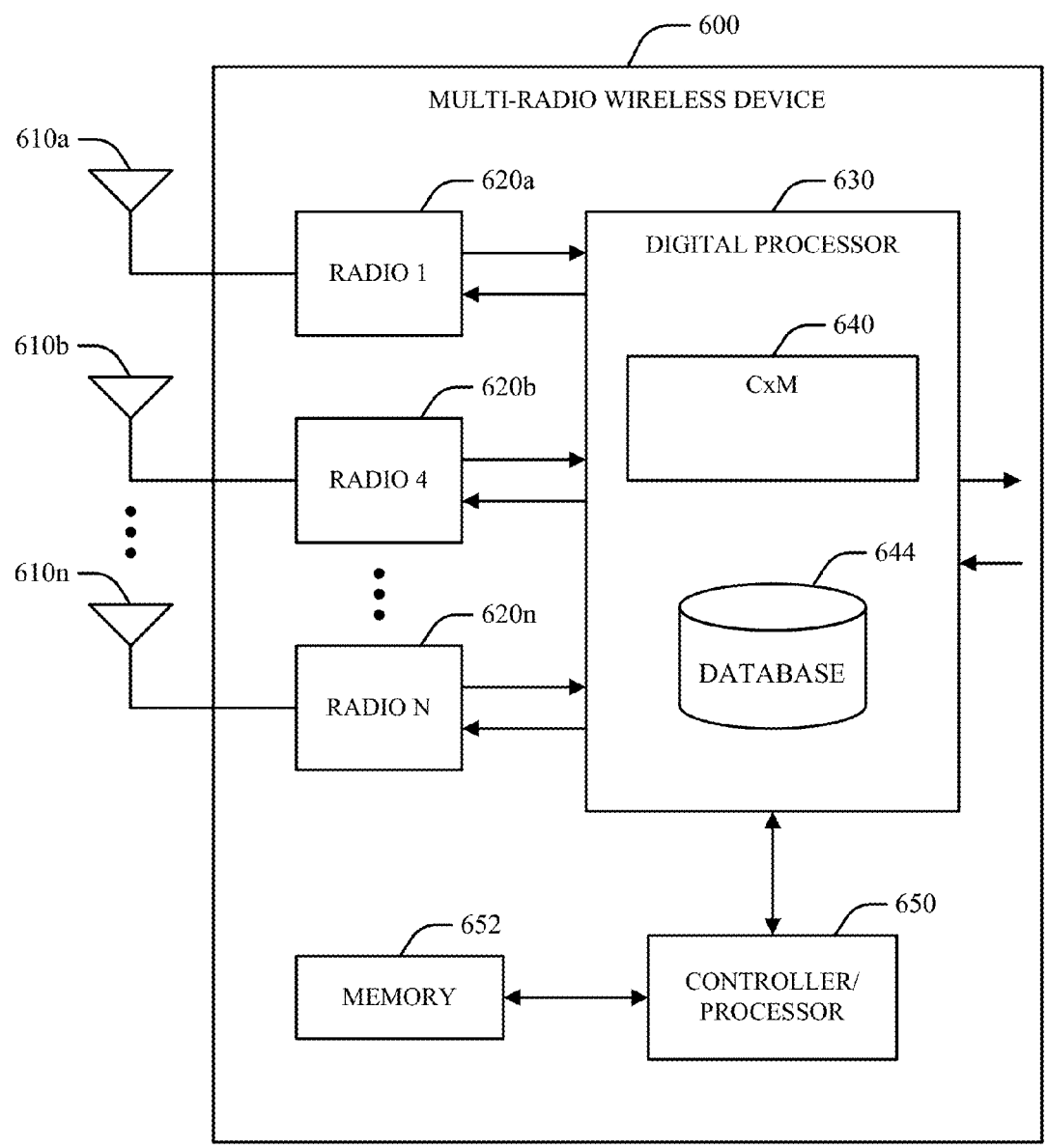
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a coexistence manager (CxM) 640 that can control operation of the radios 620 in order to improve the performance of the wireless device 600 as generally described herein. The coexistence manager 640 can have access to a database 644, which can store information used to control the operation of the radios 620. As explained further below, the coexistence manager 640 can be adapted for a variety of techniques to decrease interference between the radios. In one example, the coexistence manager 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

A multi-radio device, such as User Equipment (UE), may experience coexistence issues among various ones of its constituent radio devices that operate at the same time. In particular, a multi-radio UE may operate at a reduced transmit power level due to coexistence issues between a broadband radio (e.g., LTE) modem and a WLAN radio device of the UE. Because the 802.11 standard specifies that an acknowledgement (ACK) packet PHY (physical layer) rate is dependent on the transmit rate used by a remote device, the multi-radio UE sends ACK packets at a higher rate than its data packets. The ACK packets, however, may not be received by the remote device because the reduced transmit power level cannot support the increased PHY rate at which the ACK packets are transmitted. The remote device may reduce its PHY rate when the ACK packets are not received, resulting in a downward spiral of the data rate at the remote node to the rate used by the multi-radio UE for transmitting at the lower power level.

In one aspect of the present disclosure, a WLAN ACK packet is transmitted at a first power level and a WLAN data packet is transmitted at a second power level that is lower than the WLAN ACK packet transmit power level. In this aspect of the present disclosure, an increased ACK packet transmit power level is used when a wireless station operates at a reduced transmit power level due to coexistence issues between a broadband radio modem and a WLAN radio device of a multi-radio wireless station.

Figure 7:
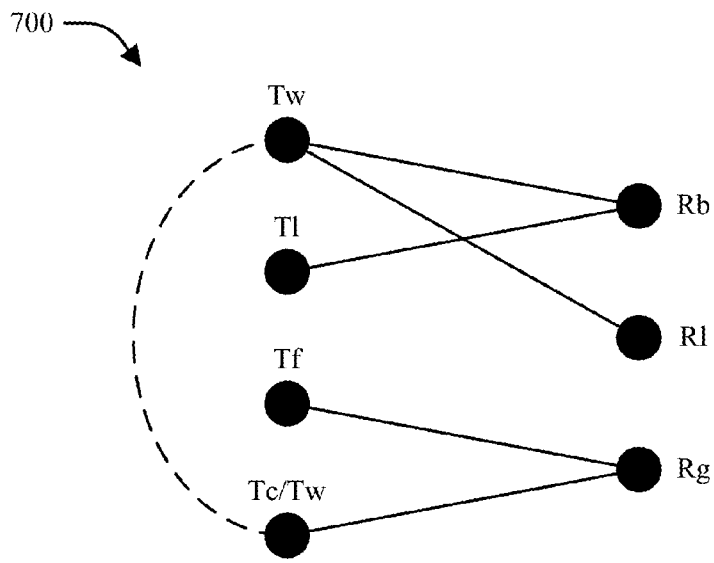
FIG. 7 is graph showing respective potential collisions between seven example radios in a given decision period.
Figure 11:
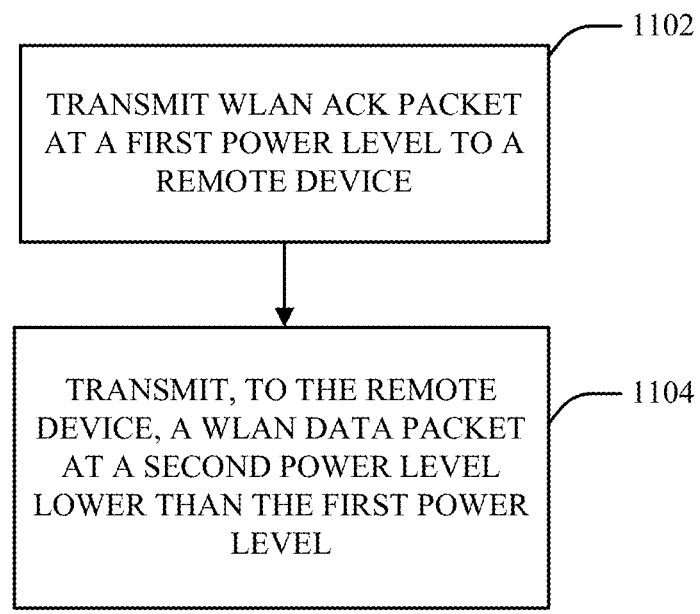
FIG. 11 is a flow diagram illustrating a method for mitigating the impact of a power imbalance on a remote data rate according to one aspect of the present disclosure.
Figure 13:
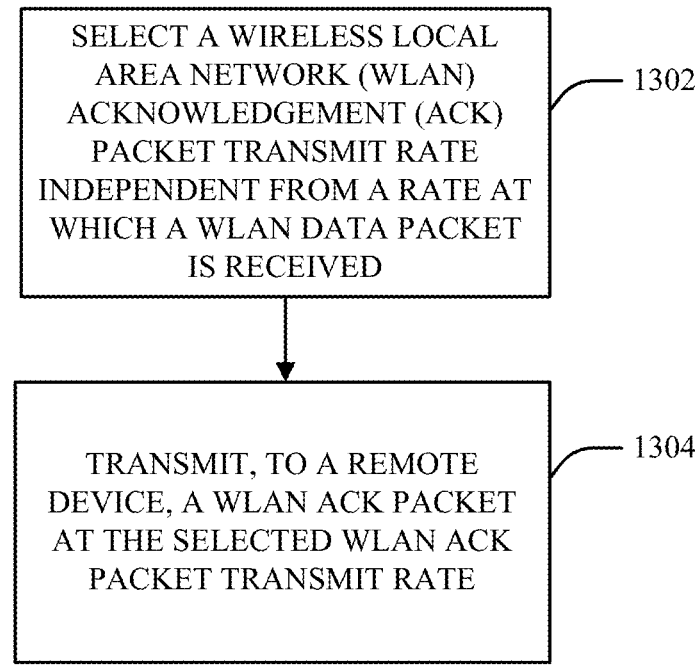
FIG. 13 is a flow diagram illustrating a method for mitigating the impact of a power imbalance on a remote data rate according to another aspect of the present disclosure.

In an aspect, the coexistence manager 640 can manage operation of respective radios 620 utilized by wireless device 600 in order to avoid interference and/or other performance degradation associated with collisions between respective radios 620. coexistence manager 640 may perform one or more processes, such as those illustrated in FIGS. 11 and 13. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (TO, a GSM/WCDMA transmitter (Tc/Tw), an LTE receiver (Rl), a Bluetooth receiver (Rb), and a GPS receiver (Rg). The four transmitters are represented by four nodes on the left side of the graph 700. The three receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
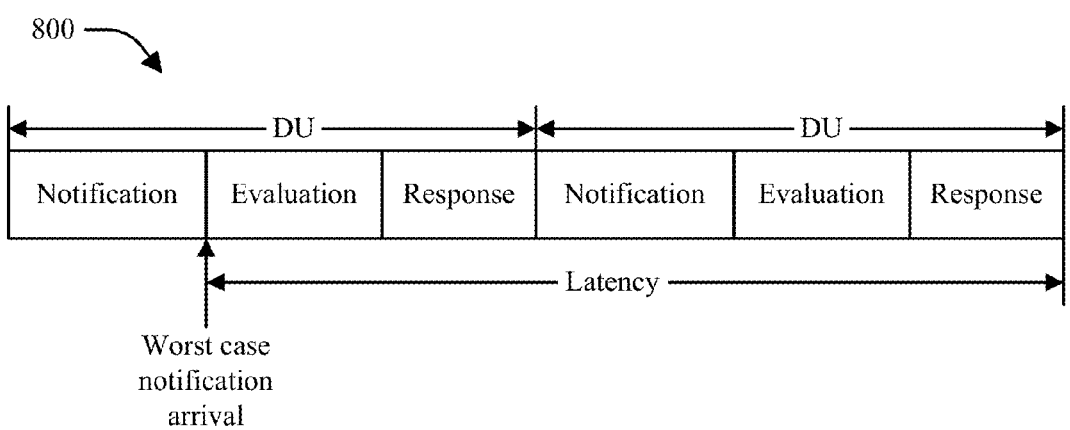
FIG. 8 is a diagram showing operation of an example Coexistence Manager (CxM) over time.

In one aspect, an example coexistence manager 640 can operate in time in a manner such as that shown by diagram 800 in FIG. 8. As diagram 800 illustrates, a timeline for coexistence manager operation can be divided into Decision Units (DUs), which can be any suitable uniform or non-uniform length (e.g., 100 µs) where notifications are processed, and a response phase (e.g., 20 μs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
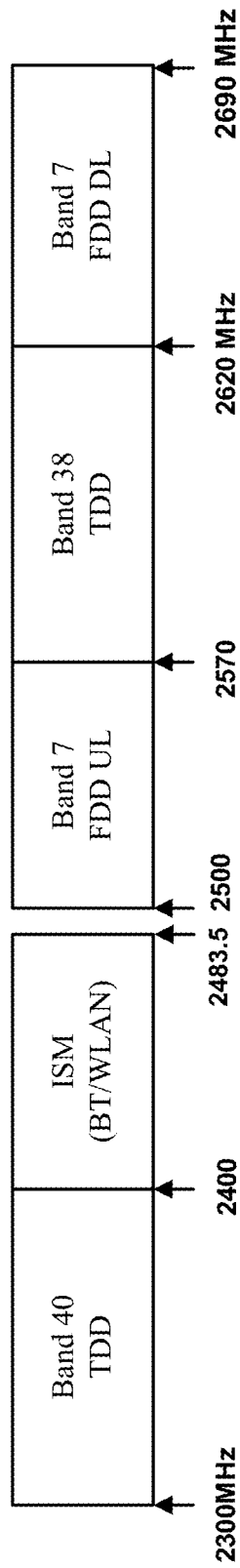
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make interfrequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Mitigating Impact of Power Imbalance on Remote Data Rate

A multi-radio device, such as a user equipment (UE), may experience coexistence issues among its constituent radio devices that operate at the same time. For example, transmissions from a Long Term Evolution (LTE) radio operating on a multi-radio UE may interfere with a UE receiver for an 802.11 device such as a wireless local area network (WLAN), or the like. In one aspect of the present disclosure, a wireless local area network (WLAN) acknowledgement (ACK) packet is transmitted at a first power level and a WLAN data packet is transmitted at a second power level that is lower than the WLAN ACK packet transmit power level. In this aspect of the present disclosure, an increased ACK packet transmit power level is used when a wireless station operates at a reduced transmit power level due to coexistence issues between an wireless modem and a WLAN radio device of a multi-radio wireless station. In a further aspect of the present disclosure, a WLAN ACK packet transmit rate is selected that is independent from a rate at which a WLAN data packet is received.

An 802.11 wireless network (Wi-Fi) operates according to a carrier sense multiple access (CSMA) scheme, in which a node verifies the absence of other traffic before transmitting on a shared medium, such as a frequency band of the electromagnetic spectrum. When an access point (AP) and a wireless station (STA) are communicating, a receiver node of a data packet transmits an acknowledgement (ACK) packet after the data packet is successfully received. The 802.11 standard defines specific rules for selecting an acknowledgement (ACK) packet PHY (physical layer) rate. In particular, the standard defines a one-to-one mapping from the data rate used in the received (RX) data packet and the selected transmit (TX) rate for the ACK packet, for example as shown in Table 1.

TABLE 1

| ACK PHY Rate | | | | | | | | |
|---|---|---|---|---|---|---|---|---|
| | RX PHY Rate (mbps) | | | | | | | |
| | 6 | 9 | 12 | 18 | 24 | 26 | 48 | 54 |
| ACK PHY Rate (mbps) | 6 | 6 | 12 | 12 | 24 | 24 | 24 | 24 |

More specifically, the ACK packet transmit rate is selected from, for example, a BSSBasicRateSet specified for the nodes joining a BSS (basic service set) in 802.11. The 802.11 standard specifies that the ACK packet transmit rate is selected as the highest rate in the BSSBasicRateSet that is not higher than the rate used in the previously received packet and using the same modulation, as shown in Table 1.

Referring again to FIG. 5, a wireless station (STA) 510 and a WLAN access point (AP) 542/552 may operate at different transmit power levels. For example, the wireless STA (e.g., a multi-radio UE) 510 may transmit at a lower power level to enable coexistence with other radios on the multi-radio UE 510. The multi-radio UE 510 may transmit at a lower power level due to regulatory emission rules, for example, as defined by the FCC (Federal Communications Commission) for fixed and portable nodes in a white space. Also, an 802.11 radio collocated with other radios (e.g., a broadband radio modem) of the multi-radio UE 510 may transmit at a lower power level to meet SAR (specific absorption rate) requirements. As another example, the access point 542/552 and the multi-radio UE 510 may operate according to different power classes, as defined in 802.11af.

Operation of a multi-radio UE 510 and an access point 542/552 at different transmit power level results in a power imbalance between the multi-radio UE 510 and the access point 542/552. As a result, the node with the lower transmit power uses a lower PHY (physical layer) rate for its data packets. The remote node with the higher transmit power level transmits at a higher data rate. Because the 802.11 standard specifies that the ACK packet PHY rate is dependent on the transmit rate used by the remote device, the local node transmitting at the lower power level may send the ACK packet at a higher rate than its data packets. This could result in an increased packet error rate for the ACK packets because the reduced transmit power levels cannot support the increased PHY rate at which they are transmitted. In response, the remote device reacts to not receiving the ACK packets by reducing its PHY rate because the remote device assumes the data packets are not received correctly. This results in a spiral of the data rate at the remote node to a rate approximating the rate used by the local device for transmitting at the lower power level.

Spiraling of a transmit data rate is an undesirable behavior because a remote device PHY rate is unnecessarily impacted by the lower transmit power of a local device. When lowering the transmit power is due to a coexistence problem (i.e., not due to compliance with regulatory rules, etc.), in one aspect of the present disclosure the device with the coexistence problem transmits the ACK packet at a higher power level that increases the likelihood that the ACK packet is decoded correctly at the increased PHY rate. Various methods are described for determining the power level of the ACK packet.

In one aspect of the present disclosure, a solution for mitigating the impact of a power imbalance on a remote data rate in a WLAN, such as an 802.11 wireless network is described. In particular, the power level of the ACK packet may be selected as a function of a path-loss between a UE and an access point at a current ACK PHY rate. In addition, the power level of the ACK packet could be selected as a function of a receiver sensitivity for ensuring the ACK packet is received correctly. Examples of WLAN standards that can have a power imbalance due to regulatory or power class limitation include the Institute of Electrical and Electronic Engineers (IEEE) 802.11af (Wi-Fi in the white space) standard and the IEEE 802.11ah standard.

In one aspect of the present disclosure, the power level of the ACK packet may be adapted to balance the interference from the ACK packet transmission to the other collocated radios and to reduce the impact of lowering the ACK transmit power level on WLAN throughput loss. For example, the power level of the ACK packet may be adapted as a function of the received signal strength of the victim collocated radio (e.g., an LTE broadband radio modem), the WLAN path-loss, and ACK packet decode sensitivity. Alternatively, the power level of the ACK packet may be selected according to a level of interference to a victim broadband radio modem of multi-radio UE 510 from the WLAN ACK packet.

A power imbalance may exist, for example, when a power back-off is used to enable coexistence between LTE transmissions and a WLAN radio of a multi-radio UE. In one aspect of the present disclosure, a power back-off method adapts a maximum transmit power level for the data packets subject to a minimum WLAN transmit power level Pmin1 (e.g., WLAN transmit power level cannot be dropped below Pmin1). In a further aspect, the ACK transmit power level is adjusted with the same power back-off method subject to a higher minimum power level Pmin2 (Pmin2>=Pmin1). Both Pmin1 and Pmin2 may be statically selected based on, for example, a RF (radio frequency) calibration to provide acceptable interference levels to the victim radio. Alternatively, both Pmin1 and Pmin2 may be dynamically selected in a quasi-static way as a function of, for example, a victim radio link quality. Moreover, the difference between Pmin1 and Pmin2 may be selected based on a WLAN link quality and the different receiver sensitivity requirements for properly decoding data and ACK packets.

As described herein, a maximum transmit power level (or power back-off value) determines a maximum transmit power of WLAN, and a minimum transmit power level (denoted in some paragraphs as Pmin1 and Pmin2) is a lower bound on the maximum back-off applied to a WLAN transmit power. In one aspect of the present disclosure, the maximum transmit power level is dynamically updated based on an LTE signal quality measurement (such as signal to interference plus noise ratio (SINR)) and a WLAN physical layer (PHY) rate, for example, while the minimum transmit power level is quasi-static based on an RF calibration, an LTE/WLAN pathloss, or the like.

One example of a power back-off method according to one aspect of the disclosure is as follows. A coexistence manager (CxM) 640 (FIG. 6) blocks WLAN transmission for a predetermined period of time (e.g., 1 ms) during an LTE downlink portion once every X ms. The SINR for the corresponding LTE downlink subframe without WLAN transmission is identified as $SINR_{good}$, and is passed to the following filter according to equation (1) where $\alpha_{good}$ is a filter coefficient:

$$\overline{SINR}_{good} = (1-\alpha_{good})\overline{SINR}_{good} + \alpha_{good}SINR_{good} \quad (1)$$

In this configuration, SINRs for other LTE subframes without explicit knowledge that WLAN transmission is off (WLAN TX OFF), is identified as $SINR_{bad}$, and is fed into the following filter to compute the average SINR with WLAN ON according to equation (2) where $\alpha_{bad}$ is a filter coefficient:

$$\overline{SINR}_{bad} = (1-\alpha_{bad})\overline{SINR}_{bad} + \alpha_{bad}SINR_{bad} \quad (2)$$

In this configuration, let n denote the index of the WLAN TX power limit update cycle, with the update cycle selected once every Y ms. In addition, the average WLAN PHY rate (averaged over the WLAN TX power limit update cycle which is Y ms) controlled by the WLAN rate adaptation algorithm is denoted as R(n). The WLAN TX power back-off calculation for a data packet may be described as follows according to equations (3) and (4) where $\mu_1$ and $\mu_2$ are scaling factors, s is a weight between aggressor and victim metrics, e is an acceptable SINR drop in a victim metric, and $\gamma$ defines a dependency of the weighting factor s on the error rate in the rate metric:

$$P(n+1) = \min(Pmax, \max(Pmin_1, P(n) - \mu_1 s(\overline{SINR}_{good} - \overline{SINR}_{bad} - \varepsilon) - \mu_2(1-s)(R(n) - Rmin))) \quad (3)$$

$$s = \frac{1}{1 + \exp(\gamma(Rmin - R(n)))} \quad (4)$$

As denoted in equation (4), Rmin is the minimum rate to ensure WLAN TX packets can fit into the LTE downlink subframe, Pmin1 is the WLAN TX power corresponding to the maximum back-off for data packets, and Pmax is the maximum WLAN TX power. When applying this to an ACK packet, the WLAN TX power level for the ACK packet may be given by equation (5):

$$P_{ACK}(n+1) = \max(Pmin_2, P(n+1)) \quad (5)$$

In one configuration, a power back-off level is stored, and a transmit power is determined accordingly. In another configuration, the maximum transmit power level is stored and the transmit power is determined accordingly. The maximum transmit power level may be determined based on joint victim and aggressor metrics, including but not limited to LTE SINR, or spectral efficiency, and aggressor metrics such as a data physical layer (PHY) rate. The minimum transmit power levels for date or ACK (Pmin1 and Pmin2) may be statically determined by RF calibration, or dynamically determined based on an LTE link quality (e.g., reference signal received power (RSRP), reference signal received quality (RSRQ), SINR, etc.) and WLAN path loss, ACK rate, ACK packet sensitivity, or the like.

In one aspect of the present disclosure, a WLAN ACK packet is transmitted at a first power level and a WLAN data packet is transmitted at a second power level that is lower than the WLAN ACK packet transmit power level. In this configuration, an ACK maximum transmit power level for a WLAN ACK packet transmit power level is stored. In addition, a data maximum transmit power level for a WLAN data packet transmit power level is stored separately. For example, a WLAN ACK packet maximum transmit power level may be 10 dBm, and a WLAN data packet maximum transmit power level may be 8 dBm according to a static configuration. In this configuration, WLAN radio hardware/software employs a first table for storing the ACK maximum transmit power level and a second table for storing the data maximum transmit power level. In a dynamic configuration, the WLAN ACK packet is transmitted at a power level based on the stored ACK maximum power level. In addition, the WLAN data packet is transmitted at a power level based on the stored data maximum power level.

In another configuration, two power back-off loops may be run. One loop is for the ACK transmit power, and the other loop is for data transmit power. The ACK power loop may be limited to monitoring interference for the ACK packets.

In a further aspect of the present disclosure, when a power imbalance is due to regulatory rules, the ACK packet may be transmitted at a lower rate in the BSSBasicRateSet that is a function of both the remote device data rate and the local device PHY rate at which a rate loop has converged. In this configuration, for a remote device to reserve a sufficient medium time to allow for the reception of the ACK packet at a lower data rate, the remote device may assume the ACK packet is sent at the lowest rate in the BSSBasicRateSet. In this aspect of the present disclosure, a WLAN ACK packet transmit rate is selected that is independent from a rate at which a WLAN data packet is received. In this configuration, the WLAN ACK packet is transmitted at the selected ACK packet transmit rate that is decoupled from the rate at which the WLAN data packet is received.

Figure 10:
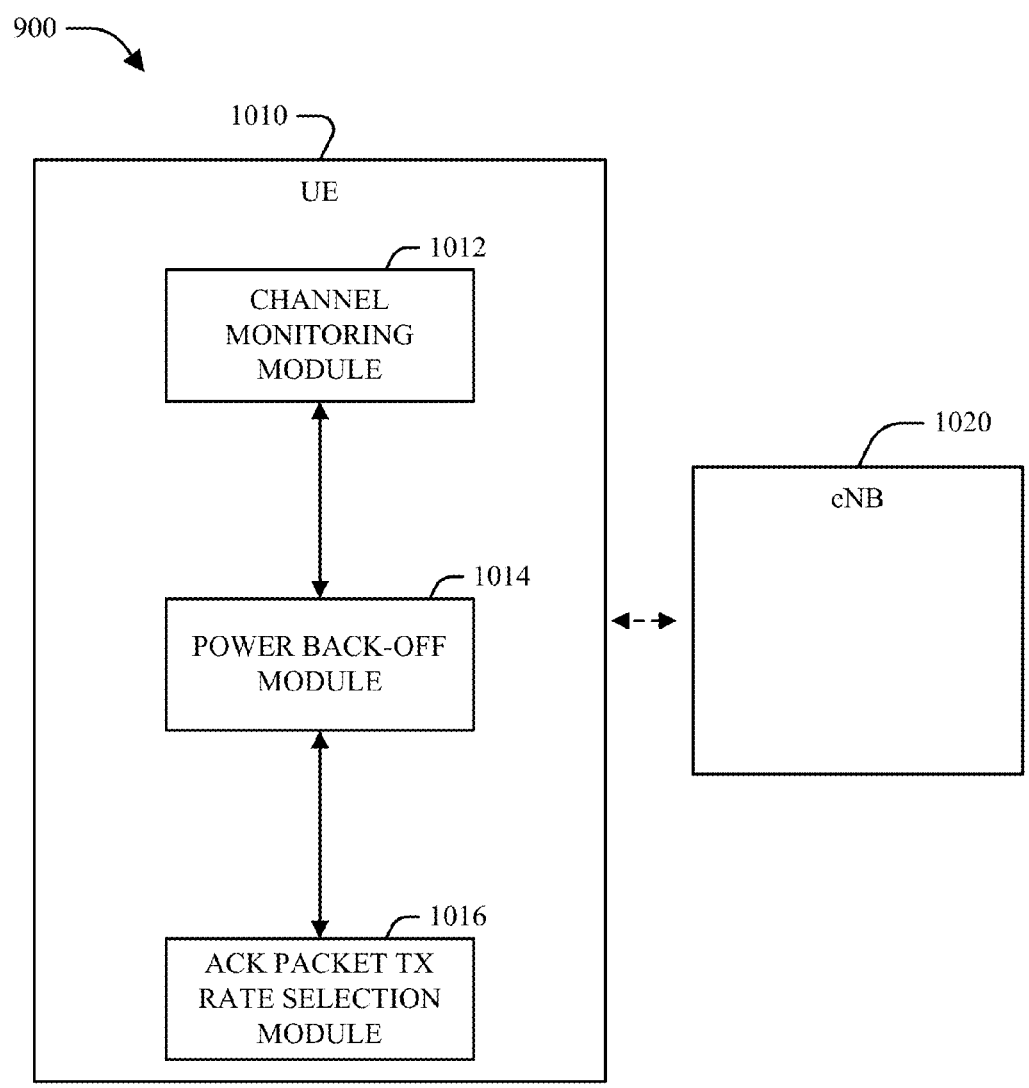
FIG. 10 is a block diagram of a system for mitigating the impact of a power imbalance on a remote data rate in a WLAN (wireless local area network) during multi-radio coexistence management according to one aspect of the present disclosure.

Turning now to FIG. 10, a block diagram of a system 1000 for mitigating the impact of a power imbalance on a remote data rate in a WLAN is illustrated. In an aspect, the system 1000 can include one or more UEs 1010 and/or eNodeBs 1020, which can engage in uplink, downlink, and/or any other suitable communication with each other and/or any other entities in the system 1000. In one example, the UE 1010 and/or eNodeB 1020 can be operable to communicate using a variety of resources, including frequency channels and subbands, some of which can potentially be colliding with other radio resources (e.g., a broadband radio such as an LTE modem). Thus, the UE 1010 can utilize various techniques for managing coexistence between multiple radios utilized by the UE 1010, as generally described herein.

To mitigate at least the indicated shortcomings, the UE 1010 incorporates one or more of the features described herein and illustrated by the system 1000 to facilitate support for multi-radio coexistence within the UE 1010. In particular, a channel monitoring module 1012, a power back-off module 1014, and an ACK packet transmit rate selection module 1016 are described. The channel monitoring module 1012 monitors the performance of communication channels for potential interference issues. For example, the channel monitoring module may monitor a link quality of an LTE broadband radio modem during operation of a WLAN radio of the multi-radio UE (STA) 1010.

In one aspect of the disclosure, the power back-off module 1014 may lower a transmit power of a WLAN radio to reduce interference with, for example, an LTE broadband radio modem. The ACK packet transmit rate selection module 1016 may select a WLAN ACK packet transmit power that is greater than a WLAN data packet transmit power level as discussed in detail above. The various modules 1012-1016 may, in some examples, be implemented as part of a coexistence manager such as the coexistence manager 640 of FIG. 6. The various modules 1012-1016 and others may be configured to implement the aspects discussed herein.

FIG. 11 is a flow diagram illustrating a method 1100 for mitigating the impact of a power imbalance on a remote data rate in an 802.11 wireless network according to one aspect of the present disclosure. As shown in FIG. 11, a wireless local area network (WLAN) acknowledgement (ACK) packet is transmitted to a remote device at a first power level, as shown at block 1102. As further shown in FIG. 11, a WLAN data packet is transmitted to the remote device at a second power level that is lower than the WLAN ACK packet transmit power level, as shown in block 1104. In this configuration, an ACK power back-off level for a WLAN ACK packet transmit power level is stored. In addition, a data power back-off level for a WLAN data packet transmit power level is separately stored. In this configuration, the WLAN ACK packet is transmitted at a power level based on the stored ACK power back-off level. In addition, the WLAN data packet is transmitted at a power level based on the stored data power back-off level.

Figure 12:
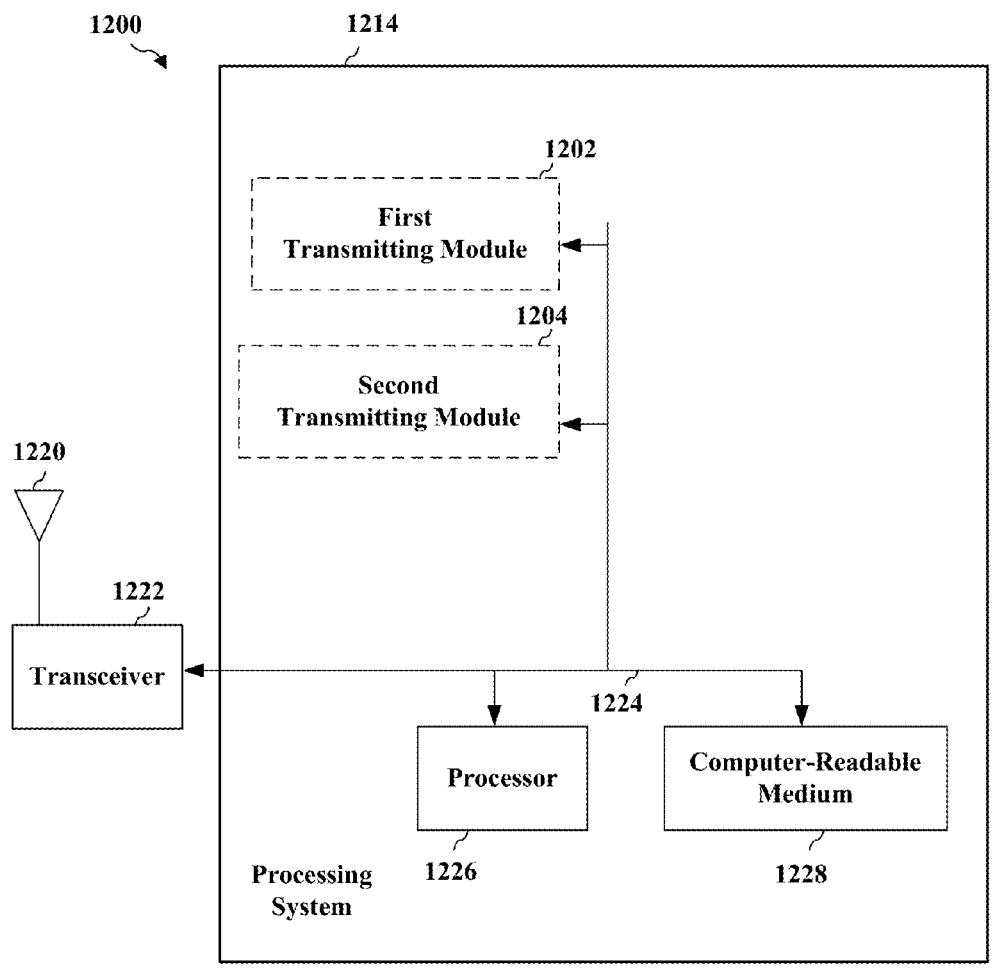
FIG. 12 is a diagram illustrating an example of a hardware implementation for an apparatus employing a power imbalance mitigation system according to an aspect of the present disclosure.

FIG. 12 is a diagram illustrating an example of a hardware implementation for an apparatus 1200 employing a power imbalance mitigation system 1214. The power imbalance mitigation system 1214 may be implemented with a bus architecture, represented generally by a bus 1224. The bus 1224 may include any number of interconnecting buses and bridges depending on the specific application of the power imbalance mitigation system 1214 and the overall design constraints. The bus 1224 links together various circuits including one or more processors and/or hardware modules, represented by a processor 1226, a first transmitting module 1202, a second transmitting module 1204, and a computer-readable medium 1228. The bus 1224 may also link various other circuits such as timing sources, peripherals, voltage regulators, and power management circuits, which are well known in the art, and therefore, will not be described any further.

The apparatus includes the power imbalance mitigation system 1214 coupled to a transceiver 1222. The transceiver 1222 is coupled to one or more antennas 1220. The transceiver 1222 provides a means for communicating with various other apparatus over a transmission medium. The power imbalance mitigation system 1214 includes the processor 1226 coupled to the computer-readable medium 1228. The processor 1226 is responsible for general processing, including the execution of software stored on the computer-readable medium 1228. The software, when executed by the processor 1226, causes the power imbalance mitigation system 1214 to perform the various functions described supra for any particular apparatus. The computer-readable medium 1228 may also be used for storing data that is manipulated by the processor 1226 when executing software.

The power imbalance mitigation system 1214 further includes the first transmitting module 1202 for transmitting a wireless local area network (WLAN) acknowledgement (ACK) packet at a first transmit power level to a remote device and a second transmitting module 1204 for transmitting, to the remote device, a WLAN data packet at a second transmit power level that is lower than the first transmit power level of the WLAN ACK packet. The first transmitting module 1202 and the second transmitting module 1204 may be software modules running in the processor 1226, resident/stored in the computer-readable medium 1228, one or more hardware modules coupled to the processor 1226, or some combination thereof. The power imbalance mitigation system 1214 may be a component of the UE 250 and may include the memory 272 and/or the processor 270, as shown in FIG. 2.

In one configuration, the apparatus 1200 for wireless communication includes a first means for transmitting and a second means for transmitting. The means may be the first transmitting module 1202, the second transmitting module 1204 and/or the power imbalance mitigation system 1214 of the apparatus 1200 configured to perform the functions recited by the first transmitting means and the second transmitting means. As described above, the first transmit means or second transmit means may be the channel monitoring module 1012, power back-off module 1014, ACK packet transmit rate selection module 1016, antenna 1220, antennae 252a-252r, processor 270, the memory 272, the transmit data processor 260, the modulator 280, and/or the transmitters 254a-254r of the UE 250 configured to perform the functions recited by the first transmit means. In another aspect, the aforementioned means may be any module or any apparatus configured to perform the functions recited by the aforementioned means.

FIG. 13 is a flow diagram illustrating a method 1100 for mitigating the impact of a power imbalance on a remote data rate in an 802.11 wireless network according to one aspect of the present disclosure. As shown in FIG. 13, an apparatus may select a wireless local area network (WLAN) acknowledgement (ACK) packet transmit rate independent from a rate at which a WLAN data packet is received, as shown at block 1302. An apparatus may also transmit, to a remote device, a WLAN ACK packet at the selected WLAN ACK packet transmit rate, as shown in block 1304.

Figure 14:
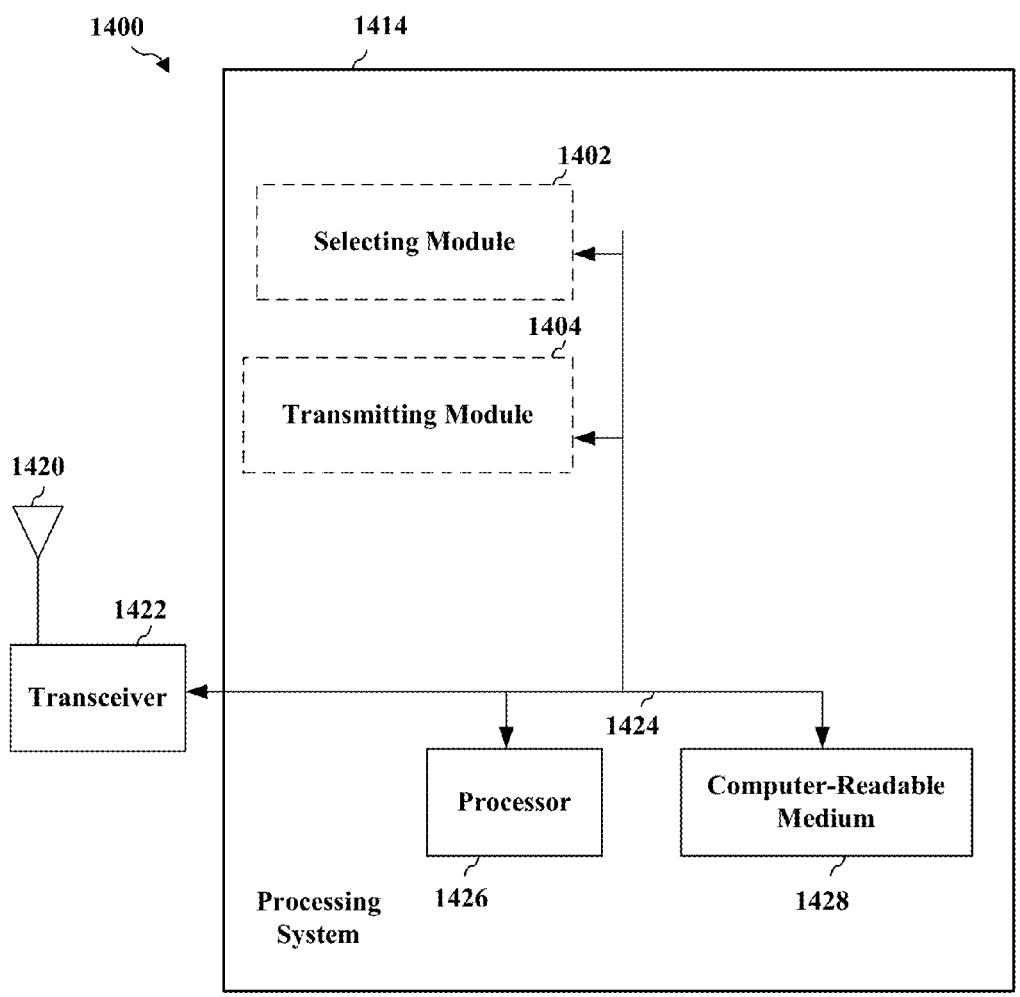
FIG. 14 is a diagram illustrating an example of a hardware implementation for an apparatus employing a power imbalance mitigation system according to another aspect of the present disclosure.

FIG. 14 is a diagram illustrating an example of a hardware implementation for an apparatus 1400 employing a power imbalance mitigation system 1414. The power imbalance mitigation system 1414 may be implemented with a bus architecture, represented generally by a bus 1424. The bus 1424 may include any number of interconnecting buses and bridges depending on the specific application of the power imbalance mitigation system 1414 and the overall design constraints. The bus 1424 links together various circuits including one or more processors and/or hardware modules, represented by a processor 1426, a selecting module 1402, a transmitting module 1404, and a computer-readable medium 1428. The bus 1424 may also link various other circuits such as timing sources, peripherals, voltage regulators, and power management circuits, which are well known in the art, and therefore, will not be described any further.

The apparatus includes the power imbalance mitigation system 1414 coupled to a transceiver 1422. The transceiver 1422 is coupled to one or more antennas 1420. The transceiver 1422 provides a means for communicating with various other apparatus over a transmission medium. The power imbalance mitigation system 1414 includes the processor 1426 coupled to the computer-readable medium 1428. The processor 1426 is responsible for general processing, including the execution of software stored on the computer-readable medium 1428. The software, when executed by the processor 1426, causes the power imbalance mitigation system 1414 to perform the various functions described supra for any particular apparatus. The computer-readable medium 1428 may also be used for storing data that is manipulated by the processor 1426 when executing software.

The power imbalance mitigation system 1414 further includes the selecting module 1402 for selecting a wireless local area network (WLAN) acknowledgement (ACK) packet transmit rate independent from a rate at which a WLAN data packet is received and a transmitting module 1404 for transmitting, to the remote device, a WLAN ACK packet at the selected WLAN ACK packet transmit rate. The selecting module 1402 and the transmitting module 1404 may be software modules running in the processor 1426, resident/stored in the computer-readable medium 1428, one or more hardware modules coupled to the processor 1426, or some combination thereof. The power imbalance mitigation system 1414 may be a component of the UE 250 and may include the memory 272 and/or the processor 270, as shown in FIG. 2.

In one configuration, the apparatus 1400 for wireless communication includes a means for selecting. The means may be the selecting module 1402 and/or the power imbalance mitigation system 1414 of the apparatus 1400 configured to perform the functions recited by the selecting means. As described above, the selecting means may be the channel monitoring module 1012, power back-off module 1014, ACK packet transmit rate selection module 1016, processor 270 and/or the memory 272, of the UE 250 configured to perform the functions recited by the first transmit means.

In one configuration, the apparatus 1400 for wireless communication includes a means for transmitting. The means may be the transmitting module 1404 and/or the power imbalance mitigation system 1414 of the apparatus 1400 configured to perform the functions recited by the transmitting means. As described above, the means for transmitting may be the antenna 1420, antennae 252a-252r, processor 270, the memory 272, the transmit data processor 260, the modulator 280, and/or the transmitters 254a-254r of the UE 250 configured to perform the functions recited by the first transmit means. In another aspect, the aforementioned means may be any module or any apparatus configured to perform the functions recited by the aforementioned means.

The examples above describe aspects implemented in an LTE system. The scope of the disclosure, however is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications in a wireless local area network (WLAN) system, comprising:
   transmitting, by a multi-radio user equipment (UE), a wireless local area network (WLAN) acknowledgement (ACK) packet at a first transmit power level to a WLAN access point in response to a first WLAN data packet; and
   transmitting, by the multi-radio UE to the WLAN access point, a second WLAN data packet at a second transmit power level that is lower than the first transmit power level of the WLAN ACK packet.

2. The method of claim 1, further comprising:
   selecting the first transmit power level for the WLAN ACK packet according to a link quality of a broadband wireless modem of the multi-radio UE during operation of a WLAN radio of the multi-radio UE.

3. The method of claim 1, further comprising:
   selecting the first transmit power level for the WLAN ACK packet according to a level of interference to a broadband radio modem of the multi-radio UE from the WLAN ACK packet.

4. The method of claim 1, further comprising:
   storing an ACK power back-off level for a WLAN ACK packet transmit power level;
   storing a data power back-off level for a WLAN data packet transmit power level;
   transmitting the WLAN ACK packet at the first transmit power level based on the stored ACK power back-off level; and
   transmitting the second WLAN data packet at the second transmit power level based on the stored data power back-off level.

5. The method of claim 4, further comprising:
   setting the stored data power back-off level according to a path-loss between a multi-radio station and a WLAN access point, an ACK packet physical layer rate and a predetermined power sensitivity of a receiver of the WLAN access point for receiving an ACK packet at the ACK packet physical layer rate.

6. The method of claim 4, further comprising:
   setting the stored data power back-off level according to a received signal strength of a wireless modem of the multi-radio UE, a path-loss between the multi-radio station and the WLAN access point, and a predetermined power sensitivity of a receiver of the WLAN access point for receiving an ACK packet at an ACK packet physical layer rate.

7. A multi-radio user equipment (UE) configured for wireless communications in a wireless local area network (WLAN) system, the apparatus comprising:
   a memory; and
   at least one processor coupled to the memory, the at least one processor being configured:
      to transmit a wireless local area network (WLAN) acknowledgement (ACK) packet at a first transmit power level to a WLAN access point in response to a first WLAN data packet; and
      to transmit, to the WLAN access point, a second WLAN data packet at a second transmit power level that is lower than the first transmit power level of the WLAN ACK packet.

8. The multi-radio UE of claim 7, in which the at least one processor is further configured to select the first transmit power level for the WLAN ACK packet according to a link quality of a broadband wireless modem of the multi-radio UE during operation of a WLAN radio of the multi-radio UE.

9. The multi-radio UE of claim 7, in which the at least one processor is further configured to select the first transmit power level for the WLAN ACK packet according to a level of interference to a broadband radio modem of the multi-radio UE from the WLAN ACK packet.

10. The multi-radio UE of claim 7, in which the at least one processor is further configured:
   to store an ACK power back-off level for a WLAN ACK packet transmit power level;
   to store a data power back-off level for a WLAN data packet transmit power level;

to transmit the WLAN ACK packet at the first transmit power level based on the stored ACK power back-off level; and to transmit the second WLAN data packet at the second transmit power level based on the stored data power back-off level.

11. The multi-radio UE of claim 10, in which the at least one processor is further configured to set the stored data power back-off level according to a path-loss between the multi-radio UE and the WLAN access point, an ACK packet physical layer rate and a predetermined power sensitivity of a receiver of the WLAN access point for receiving an ACK packet at the ACK packet physical layer rate.

12. The multi-radio UE of claim 10, in which the at least one processor is further configured to set the stored data power back-off level according to a received signal strength of a wireless modem of the multi-radio multi-radio UE, a path-loss between the multi-radio multi-radio UE and the WLAN access point, and a predetermined power sensitivity of a receiver of the WLAN access point for receiving an ACK packet at an ACK packet physical layer rate.

13. A computer program product configured for wireless communications in a wireless local area network (WLAN) system, the computer program product comprising:

a non-transitory computer-readable medium having non-transitory program code recorded thereon, the program code comprising:

program code to transmit, by a multi-ratio user equipment (UE), a wireless local area network (WLAN) acknowledgement (ACK) packet at a first transmit power level to a WLAN access point in response to a first WLAN data packet; and program code to transmit, by the multi-radio (UE) to the WLAN access point, a second WLAN data packet at a second transmit power level that is lower than the first transmit power level of the WLAN ACK packet.

14. The computer program product of claim 13, in which the program code further comprises program code to select the first transmit power level for the WLAN ACK packet according to a link quality of a broadband wireless modem during operation of a WLAN radio of the multi-radio UE.

15. A apparatus configured for wireless communications in a wireless local area network (WLAN) system, the apparatus comprising:

means for transmitting, by a multi-radio user equipment (UE), a wireless local area network (WLAN) acknowledgement (ACK) packet at a first transmit power level to a WLAN access point in response to a first WLAN data packet; and means for transmitting, by the multi-radio UE to the WLAN access point, a second WLAN data packet at a second transmit power level that is lower than the first transmit power level of the WLAN ACK packet.

16. The apparatus of claim 15, further comprising means for selecting the first transmit power level for the WLAN ACK packet according to a link quality of a broadband wireless modem of the multi-radio UE during operation of a WLAN radio of the multi-radio-UE.

17. A method of wireless communication in a wireless local area network (WLAN) system, comprising:

selecting, by a multi-radio user equipment (UE), a wireless local area network (WLAN) acknowledgement (ACK) packet transmit data rate different from a data rate at which a WLAN data packet is received from a WLAN access point, in which the WLAN ACK packet transmit data rate is selected by assuming that a transmit data rate of the WLAN data packet is a lowest data rate specified in a WLAN basic service set; and transmitting, by the multi-radio UE to the WLAN access point, a WLAN ACK packet at the selected WLAN ACK packet transmit data rate.

18. A multi-radio user equipment (UE) configured for wireless communications in a wireless local area network (WLAN) system, the apparatus comprising:

a memory; and at least one processor coupled to the memory, the at least one processor being configured:

to select a wireless local area network (WLAN) acknowledgement (ACK) packet transmit data rate different from a data rate at which a WLAN data packet is received from a WLAN access point, in which the WLAN ACK packet transmit data rate is selected by assuming that a transmit data rate of the WLAN data packet is a lowest data rate specified in a WLAN basic service set; and to transmit, to the WLAN access point, a WLAN ACK packet at the selected WLAN ACK packet transmit data rate.

19. A computer program product configured for wireless communications in a wireless local area network (WLAN) system, the computer program product comprising:

a non-transitory computer-readable medium having non-transitory program code recorded thereon, the program code comprising:

program code to select, by a multi-radio user equipment (UE), a wireless local area network (WLAN) acknowledgement (ACK) packet transmit data rate different from a data rate at which a WLAN data packet is received from a WLAN access point, in which the WLAN ACK packet transmit data rate is selected by assuming that a transmit data rate of the WLAN data packet is a lowest data rate specified in a WLAN basic service set; and program code to transmit, by the multi-radio user equipment (UE), to the WLAN access point, a WLAN ACK packet at the selected WLAN ACK packet transmit data rate.

20. A apparatus configured for wireless communications in a wireless local area network (WLAN) system, the apparatus comprising:

means for selecting, by a multi-radio user equipment/UE, a wireless local area network (WLAN) acknowledgement (ACK) packet transmit data rate different from a data rate at which a WLAN data packet is received from a WLAN access point, in which the WLAN ACK packet transmit data rate is selected by assuming that a transmit data rate of the WLAN data packet is a lowest data rate specified in a WLAN basic service set; and means for transmitting, by the multi-radio UE to the WLAN access point, a WLAN ACK packet at the selected WLAN ACK packet transmit data rate.

* * * * *